US006674003B1

(12) United States Patent
Torres

(10) Patent No.: US 6,674,003 B1
(45) Date of Patent: Jan. 6, 2004

(54) TAMPER-RESISTANT OUTLET COVER

(75) Inventor: Armando Torres, Bristow, VA (US)

(73) Assignee: Fannie Mae, Washington, DC (US)

( * ) Notice: Subject to any disclaimer, the term of this patent is extended or adjusted under 35 U.S.C. 154(b) by 0 days.

(21) Appl. No.: 10/401,990

(22) Filed: Mar. 31, 2003

(51) Int. Cl.[7] .......... H02G 3/14

(52) U.S. Cl. .......... 174/66; 174/67; 220/241; 220/242

(58) Field of Search .......... 174/66, 67; 220/241, 220/242; 439/142, 135, 148, 149

(56) References Cited

U.S. PATENT DOCUMENTS

| | | | | |
|---|---|---|---|---|
| 2,629,761 A | | 2/1953 | Determan | |
| 2,932,811 A | | 4/1960 | Abraham et al. | |
| 3,686,616 A | | 8/1972 | Bowerman | |
| 3,989,334 A | | 11/1976 | Fortino | |
| 4,293,733 A | * | 10/1981 | Royer | 174/67 |
| 4,671,587 A | | 6/1987 | Lerner et al. | |
| 4,801,271 A | * | 1/1989 | Piper | 439/148 |
| 5,009,610 A | | 4/1991 | Woskow | |
| 5,017,148 A | | 5/1991 | Buckshaw | |
| 5,106,314 A | | 4/1992 | Bael | |
| 5,269,697 A | | 12/1993 | Essex | |
| 5,320,542 A | | 6/1994 | Cheng | |
| 5,320,543 A | | 6/1994 | Barton | |
| 6,051,788 A | * | 4/2000 | Nichols | 174/67 |

FOREIGN PATENT DOCUMENTS

GB 2 186 746 A 8/1987

* cited by examiner

*Primary Examiner*—Dhir R Patel
(74) *Attorney, Agent, or Firm*—Jones, Tullar & Cooper, PC

(57) ABSTRACT

A tamper-resistant outlet cover uses a spreadable grounding socket engageable post to secure the cover in place to thereby block access to an electrical receptacle, typically a wall outlet. The post is spread by insertion of a spreader, typically a threaded screw. The head of the screw is configured to only be engaged by a cooperatively shaped tool. Installation and removal of the cover is thus afforded only to one in possession of the tool.

16 Claims, 2 Drawing Sheets

TAMPER-RESISTANT OUTLET COVER

FIELD OF THE INVENTION

The present invention is directed generally to a cover for an electrical outlet. More particularly, the present invention is directed to a tamper-resistant cover for an electrical wall outlet. Most specifically, the present invention is directed to a tamper-resistant outlet cover that requires the use of a cooperatively shaped tool to accomplish its installation and removal. The tamper-resistant outlet cover is positionable in a generally conventional electrical wall outlet that has two electrical plug blade receiving apertures and one electrical plug grounding prong or post receiving socket. The outlet cover utilizes a split and spreadable grounding prong or post, together with a grounding prong or post spreading element, to hold the cover in place.

BACKGROUND OF THE INVENTION

In a typical office environment, and particularly in a multi-person office environment, a plurality of computers are in use. Each computer, with its associated monitor and printer, is powered by electricity that is typically supplied from a conventional wall outlet. The usual wall outlet has two three apertured outlets that are defined by a suitable wall plate. Often, the computer and its associated peripherals will all be plugged into a surge protector whose purpose is to protect the equipment from damage resulting from possible power surges or current spikes. The surge protector is again connected to the convention wall outlet, typically by a short length of power cord.

Anyone who has been in a typical office will appreciate the havoc that is created by a loss of electrical power. Unless each computer is protected by some type of a back-up power supply, the loss of electricity, means that whatever is being worked on at the time of the loss of power will itself be lost. Despite the admonition to back up data on a frequent basis, such losses of data and work product are apt to be substantial. The result, in the instance of an electrical power failure, is loss of work product and loss of time.

Some electrical outages are beyond human control. The summer thunder storm, the failure of a transformer and the like are examples of unpredictable electrical failures that are a part of life. However, many potential power outages can be anticipated and precautions can be taken to avoid such outages. In many office buildings, especially in those buildings that are more than a few years old, the electrical wiring systems were not intended to accommodate the demands placed on them by the now common use of multiple computers. If the current load is overstepped, one or more circuit breakers will open. Such an occurrence will then require the services of maintenance personnel to re-set the breaker. Again, the result is a loss of data and a loss of productivity.

Often through trial and error, the capacity of an electrical distribution network in an office is determined. So long as that capacity is not exceeded, the office functions and the computers stay on. However, the addition of another electrical device, and particularly one which draws a substantial amount of current will upset the balance and trip the breakers. Vacuum cleaners operated by janitorial staff, space heaters used by cold employees in winter, fans used by the same employees in summer, and a multitude of coffee pots, water heaters and the like all can upset the balance.

In an effort to avoid circuit breaker openings, signs will be posted, memos will be circulated, and employees will be reminded, None of these efforts typically meet with long-term success. The memos are unread, the signs are unheeded and the discussions are forgotten. One employee plugs in a space heater or one janitor plugs in a vacuum cleaner or a floor scrubber. The result is the same, a loss of data and productivity as computers fail.

One effort to alleviate this problem has been the use of outlet covers. Every parent is familiar with the well-known child resistant outlet covers that have been employed to "child proof" a room or a home. These are typically plastic plates with a pair of wall outlet aperture engaging blades. While they are effective in preventing a small child from inserting an object into a wall outlet socket, they are easily removed by an adult. They do not provide a sufficient deterrent to an adult to accomplish the desired objective of preventing the connection of additional electrical equipment to a wall outlet.

It will thus be seen that a need exists for an outlet cover that is effective, efficient and easy to use. The tamper-resistant outlet cover in accordance with the present invention provides such a device that overcomes the limitations of the prior art.

SUMMARY OF THE INVENTION

It is an object of the present invention to provide an outlet cover.

Another object of the present invention is to provide a tamper-resistant outlet cover.

A further object of the present invention is to provide an outlet cover which is readily installed.

Still another object of the present invention is to provide an outlet cover which is securely attachable to a wall outlet socket.

Even yet a further object of the present invention is to provide a tamper-resistant outlet cover that is inexpensive and effective.

The tamper-resistant outlet cover in accordance with the present invention utilizes a pair of blades that are received in the two active sockets of a wall outlet. A generally cylindrical post is insertable into the grounding socket of the wall outlet. The two blades and the post are all connected to the rear face of a generally ovoid face plate. The entire cover is made of a non conductive material, such as plastic. The grounding socket engaging post has an axially extending central bore or aperture that is sized to receive a spreading element, typically a headed screw. As the screw is inserted into the post, it causes the post to increase in diameter. With the outlet cover positioned so that its blades and post are in the two active and the single grounding socket, respectively, the insertion of the spreading element into the grounding post acts to increase the diameter and thus the effective circumference of the post. This spreading of the post secures the post in place in the outlet's grounding socket. The head of the spreading element, such as a screw, is configured to be engageable only with a cooperatively shaped tool. This tool can have a number of suitable yet non-conventional shapes other than those of conventional screw drivers.

Once the tamper-resistant outlet cover has been put in place and the spreader element has been inserted, the outlet cover is difficult to remove, absent the use of the cooperatively configured tool. With the appropriately configured tool, the outlet cover is easily removed. The installed cover thus provides an effective deterrent to the unauthorized connection of extraneous electrical equipment, such as space heaters, fans, vacuum cleaners, floor scrubbers and buffers and the like while at the same time being quickly removable by authorized personnel.

The tamper-resistant outlet cover in accordance with the present invention is simple yet effective. It is quite easily and inexpensively fabricated. It requires a special tool for its use. However, that special tool is not expensive and is one that is likely to be available to authorized personnel. The use of the tamper-resistant outlet cover in accordance with the present invention dramatically reduces the incidence of circuit breaker openings and their resultant computer failure related problems. The tamper-resistant outlet cover of the present invention is an effective solution to the problem. It is a substantial advance in the art.

BRIEF DESCRIPTION OF THE DRAWINGS

A full and complete understanding of the tamper-resistant outlet cover in accordance with the present invention may be had by referring to the following description of the preferred embodiments taken in conjunction with the accompanying drawings in which.

DESCRIPTION OF THE PREFERRED EMBODIMENTS

Figures 1, 2, 3, 4:
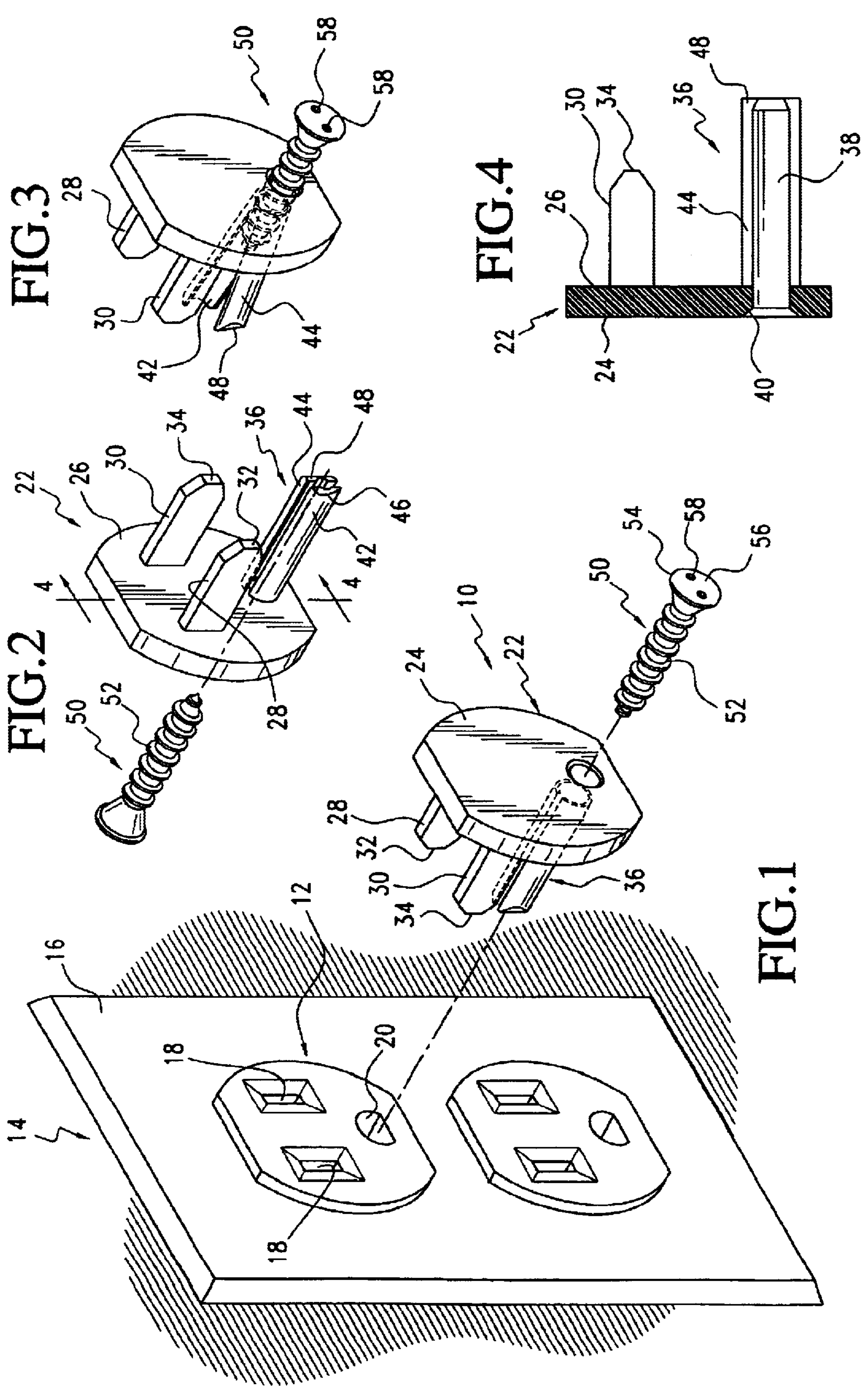
FIG. 1 is an exploded perspective view of a first preferred embodiment of a tamper-resistant outlet cover in accordance with the present invention and showing the cover in cooperation with a wall outlet.
FIG. 2 is another exploded perspective view of the tamper-resistant outlet cover taken from the rear of the cover.
FIG. 3 is an assembled perspective view of the first preferred embodiment of the outlet cover showing the spreader partially inserted.
FIG. 4 is a cross-sectional side elevation view of the first preferred embodiment of the tamper-resistant outlet cover taken along line 4—4 of FIG. 2.

Referring initially to FIG. 1, there may be seen generally at 10 a first preferred embodiment of a tamper-resistant outlet cover in accordance with the present invention. Tamper-resistant outlet cover 10 is intended to be used to cover or to block one receptacle 12 of a typical electrical wall outlet, generally at 14. As is well known, the typical wall outlet 14 includes a cover plate 16 that is secured to, and covers an electrical outlet box, which is not specifically depicted. The cover plate 16 typically provides two receptacles 12, each of which has a pair of an active electrical plug blade receiving slots 18 as well as an electrical plug grounding prong or post receiving socket 20. Such wall outlets 14 and receptacles 12 are well known and are of standard size and shape.

The tamper-resistant outlet cover 10, as indicated previously, is sized and configured to block access to one receptacle 112 of the wall outlet 14. It is clearly within the purview of the present invention to provide a cover plate that could block access to both receptacles 12 of a wall outlet 14. However, it is typically more convenient to block or disable only one receptacle 12 at a time.

Tamper-resistant outlet cover 10 is preferably made of plastic or a similar non-conductive and deformable material. Cover 10 includes a cover plate, generally at 22. This cover plate 22 includes a front face 24 and a rear face 26, as seen more clearly in FIG. 2. The cover plate 22 is sized to cover the receptacle 12 in the wall outlet 14 with which it will be used. As shown in FIGS. 1–3, the cover plate 22 is generally in the shape of a truncated oval. It will be understood that the exact shape of the cover plate 22 is selected so that it will adequately cover the receptacle 12 which it is intended to cooperate with.

A pair of active socket engaging blades 28 and 30 are connected, at their proximal ends, to the rear face 26 of the cover plate 22. These blades 28 and 30 extend away from the cover plate's rear face 26 and are unsupported at their distal ends 32, 34; respectively. These blades 28 and 30 are sized to be receivable in the two active slots 18 of the receptacle 12 of the wall outlet 14. Their distal ends 32 and 34, respectively are preferably tapered to facilitate the insertion of the blades 28 and 30 into the two active slots 18 of the receptacle 12 of the wall outlet 14.

A grounding socket engaging post, generally at 36 is also formed integral with, or is attached to the rear face 26 of the cover plate 22. This grounding socket engaging post 36 is generally cylindrical and has a central, axially extending bore 38. Bore 38 originates at the front face 24 of the cover plate 22 in a suitable chamfered cover aperture 40 and extends axially the length of the port 36. As seen more clearly in FIGS. 2–4, post 36 is separated into two post segments 42 and 44, each of which is generally semi-cylindrical in shape. Proximal ends of the two post segments 42 and 44 are joined to the rear face 26 of the cover plate 22, as seen most clearly in FIG. 4. Distal ends 46 and 48 of the two post segments 42 and 44 are not connected, in the first preferred embodiment of the tamper-resistant cover plate of the present invention, as may also be seen by referring to FIGS. 2–4. These two post segments 42 and 44 are formed by bifurcating the post 36 axially from its juncture with the rear face 24 of the cover plate 22 to the distal ends 46 and 48 of the post segments 42 and 44.

A spreader, generally at 50, is useable to spread apart the distal ends 46 and 48 of the two segments 42 and 44 of the grounding socket engaging post 36, once the tamper-resistant outlet cover, generally at 10 has been inserted into the receptacle 12 of the wall outlet 14. The spreader 50 is preferably a headed screw having a threaded shank 52 and a champered head 54. Head 54 has a face 56 that is specially configured to cooperate with a complimentarily shaped tool, which is not specifically depicted. In the configuration shown in FIGS. 1 and 3, screw head face 56 has a pair of spaced bores 58. It will be understood that these face bores 58 are sized and spaced to receive a pair of tips of a screwdriver-like tool. Only that tool, which is known in the art, but which is typically not possessed by an office worker or a janitor, will be able to turn the screw so that the threaded shank 52 of the screw or spreader 50 will travel along the axially extending bore 38 of the split post 36.

In use, the tamper-resistant outlet, cover 10, in accordance with the present invention, will be placed in a receptacle 12 of a wall outlet 14, which receptacle 12 is to be blocked. The two blades 28 and 30 of the cover 10 are inserted into the active slots 18 of the receptacle 12 and the grounding socket engaging post 36 of cover 10 is placed into the grounding socket 20 of the receptacle 12. Once this has been done, the spreader 50 is inserted into the bore 38 of the post 36 through the cover aperture 40. The spreader is screwed into the post bore 38. As spreader 50 travels axially along the bore 38, it causes the two distal ends 46 and 48 of the post segments 42 and 44 to spread apart. Since the post segments 42 and 44 are constrained inside the grounding socket 20 of the receptacle 12, the insertion of the spreader 50 will increase the effective circumference of the post 36, to the extent possible in view of the constraints imposed by the diameter of the grounding socket 20. This effects a positive securement of the post 36 in the socket 20 and thus a positive securement of the cover 10 over the receptacle 12. It will be understood that the length of the shank 52 of the spreader 50 is selected so that the spreader 50 can be screwed fully into the axial bore 38 of the post 36. The head 54 of the spreader 50 will be received in the champered cover aperture 40 with the face 56 of the spreader head 54 being flush with the front face 24 of the cover plate 22. Removal of the tamper-resistant outlet cover 10 is easily accomplished by simply backing the spreader 50 out of the post bore 38. This is again accomplished using the cooperatively shaped tool which is configured to engage the bores 58 or the other surface configuration of the spreader head 54.

Figure 6:
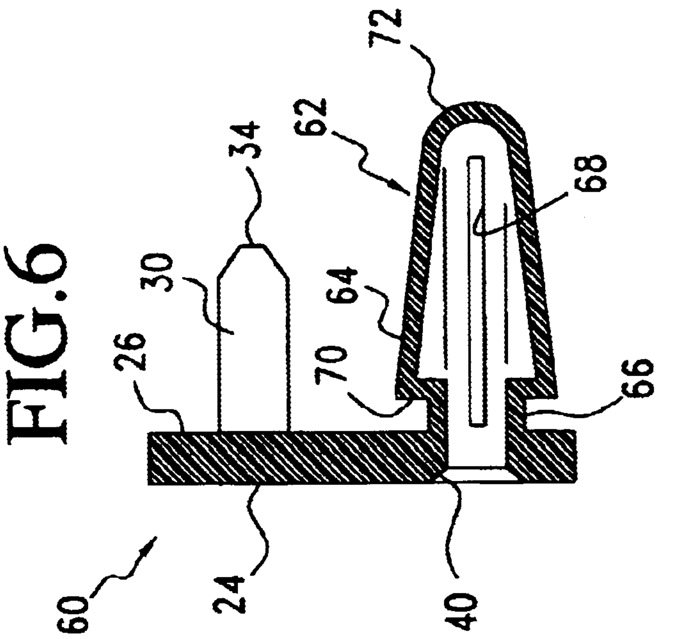
FIG. 6 is a cross-sectional side elevation view of the tamper-resistant outlet cover taken along line 6—6 of FIG. 5.
Figure 5:
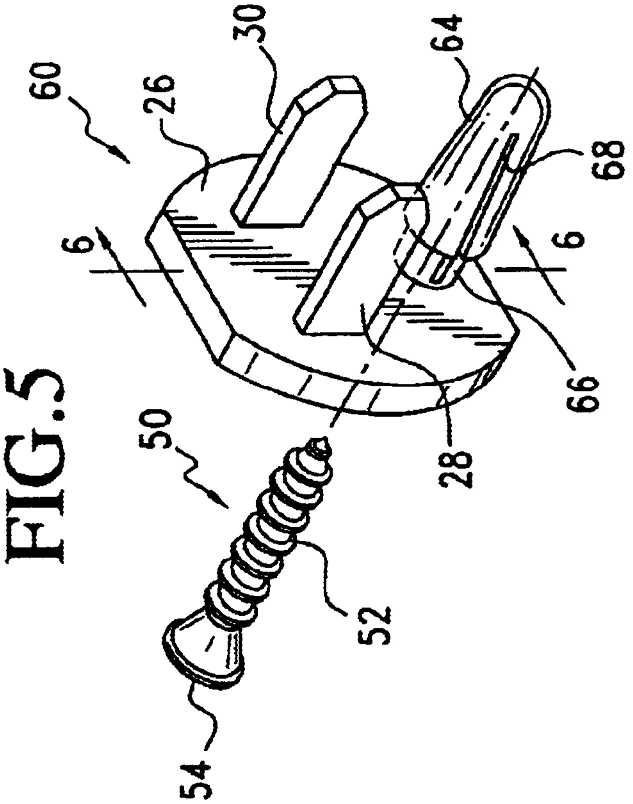
FIG. 5 is an exploded perspective view of a second preferred embodiment tamper-resistant outlet cover in accordance with the present invention.

Turning now to FIGS. 5 and 6, there may be seen a second preferred embodiment of a tamper-resistant outlet cover in accordance with the present invention, generally at 60. Cover 60 is generally the same in overall construction and operation as is the cover 10 discussed above. The same numerals will be used for corresponding elements in both embodiments. In the cover 60, the grounding socket engaging post, generally at 62 is comprised of a generally cone-shaped or tapered segment 64 which is attached to the rear face 26 of the cover plate 22 of the outlet cover by an annular sleeve 66. Both the cone-shaped segment 66 and the annular sleeves 66 have axially extending slots 68. These slots 68 allow the sleeve 66 and the cone-shaped segment 66 to increase in diameter and circumference when the spreader 50 is inserted through the cover aperture 40. The cone shape of the segment 64, which defines a shoulder 70 where it joins the annular sleeve 66, may, in some circumstances, provide an even more secure attachment of the outlet cover 60 to the wall receptacle 12. It would also be possible to provide the cone-shaped segment 64 of the cover 60 as a truncated cone. In such a configuration, which is not specifically depicted, a distal position 72 of the cone-shaped segment 64 could be cut off. This would allow the distal ends of the now separate at least two cone-shaped segments, as defined by the axial slots 68, to spread apart to a greater degree. Again, such spreading is limited by the diameter or circumference of the grounding socket 20 of the wall receptacle 12 into which the post 62 of the tamper-resistant outlet cover 60 is placed.

While preferred embodiments of a tamper-resistant outlet cover in accordance with the present invention have been set forth fully and completely hereinabove, it will be apparent to one of skill in the art that various changes in, for example the specific non-conductive material used to make the outlet cover, the overall size of the cover and the like can be made without departing from the true spirit and scope of the present invention which is accordingly to be limited only by the following claims.

What is claimed is:

1. A tamper-resistant outlet cover comprising:

a cover plate;

a cover aperture in said cover plate;

a pair of blades extending from said cover plate and adapted for engagement with active slots of an electrical outlet;

a post extending from said cover plate generally adjacent said blades and adapted for engagement with a grounding socket of an electrical outlet, said post having a plurality of post segments and having an effective circumference;

a bore extending in said post from said cover aperture; and means for increasing said effective circumference of said post when said post is engaged with the grounding socket.

2. The outlet cover of claim 1 wherein said post is generally cylindrical.

3. The outlet cover of claim 1 wherein there are two of said post segments forming said post.

4. The outlet cover of claim 1 wherein said means for increasing said effective circumference of said post is a spreader.

5. The outlet cover of claim 4 wherein said spreader is a screw.

6. The outlet cover of claim 5 wherein said screw includes a threaded shank and a head, said shank being receivable in said bore and said head being receivable in said cover aperture.

7. The outlet cover of claim 6 wherein said head of said screw includes a face, said face being provided with a tool receiving configuration.

8. The outlet cover of claim 7 wherein said tool receiving configuration requires the use of a cooperatively-shaped tool.

9. The outlet cover of claim 1 wherein said post is open at a post end remote from said cover plate.

10. The outlet cover of claim 1 wherein said post is closed at a post end remote from said cover plate.

11. The outlet cover of claim 1 wherein said plurality of post segments are semi-cylindrical.

12. The outlet cover of claim 1 wherein said plurality of post segments are cone-shaped.

13. The outlet cover of claim 1 wherein said cover plate is generally ovoid and has a front face and a rear face.

14. The outlet cover of claim 13 wherein said blades and said post extend from said rear face.

15. The outlet cover of claim 13 wherein said cover aperture has a chamfer at said front face of said cover plate.

16. The outlet cover of claim 1 wherein said cover is a non conductive material.

* * * * *